(12) United States Patent  (10) Patent No.: US 8,872,857 B2
Mikkelsen et al.  (45) Date of Patent: Oct. 28, 2014

(54) SUPERVISORY CONTROL SYSTEM, METHOD AND COMPUTER PROGRAM PRODUCTS

(75) Inventors: Christine Mikkelsen, Västerås (SE); Dilip Kota, Västerås (SE)

(73) Assignee: ABB Research Ltd., Zurich (CH)

( * ) Notice: Subject to any disclaimer, the term of this patent is extended or adjusted under 35 U.S.C. 154(b) by 417 days.

(21) Appl. No.: 13/265,673

(22) PCT Filed: Jul. 8, 2009

(86) PCT No.: PCT/EP2009/058672
§ 371 (c)(1),
(2), (4) Date: Oct. 21, 2011

(87) PCT Pub. No.: WO2010/121672
PCT Pub. Date: Oct. 28, 2010

(65) Prior Publication Data
US 2012/0032985 A1  Feb. 9, 2012

Related U.S. Application Data

(60) Provisional application No. 61/202,941, filed on Apr. 22, 2009.

(51) Int. Cl.
*G09G 5/00* (2006.01)
*G05B 23/02* (2006.01)

(52) U.S. Cl.
CPC ................................. *G05B 23/0272* (2013.01)

USPC ............ 345/660; 345/592; 345/629; 700/286

(58) Field of Classification Search
CPC ........................................................ G05B 23/02
USPC .......................... 345/660, 592, 629; 700/286
See application file for complete search history.

(56) References Cited

U.S. PATENT DOCUMENTS

| 2006/0268018 A1 | 11/2006 | Christman et al. |
| 2007/0185987 A1 | 8/2007 | Dieberger et al. |
| 2007/0216712 A1* | 9/2007 | Louch ........................... 345/660 |

FOREIGN PATENT DOCUMENTS

| EP | 1 331 536 A1 | 7/2003 |
| EP | 1 965 301 A1 | 9/2008 |
| WO | WO 2006/103541 A1 | 10/2006 |
| WO | WO 2007/050175 A2 | 5/2007 |
| WO | WO 2007/093850 A2 | 8/2007 |

* cited by examiner

*Primary Examiner* — Maurice L McDowell, Jr.
(74) *Attorney, Agent, or Firm* — Birch, Stewart, Kolasch & Birch, LLP

(57) ABSTRACT

A supervisory control system includes a display unit for displaying an overview picture including at least one object. The supervisory control system further includes a display view displaying in an integrated manner the overview picture including overview information and a detailed information view including detailed information. A corresponding method and computer program products are also included.

21 Claims, 3 Drawing Sheets

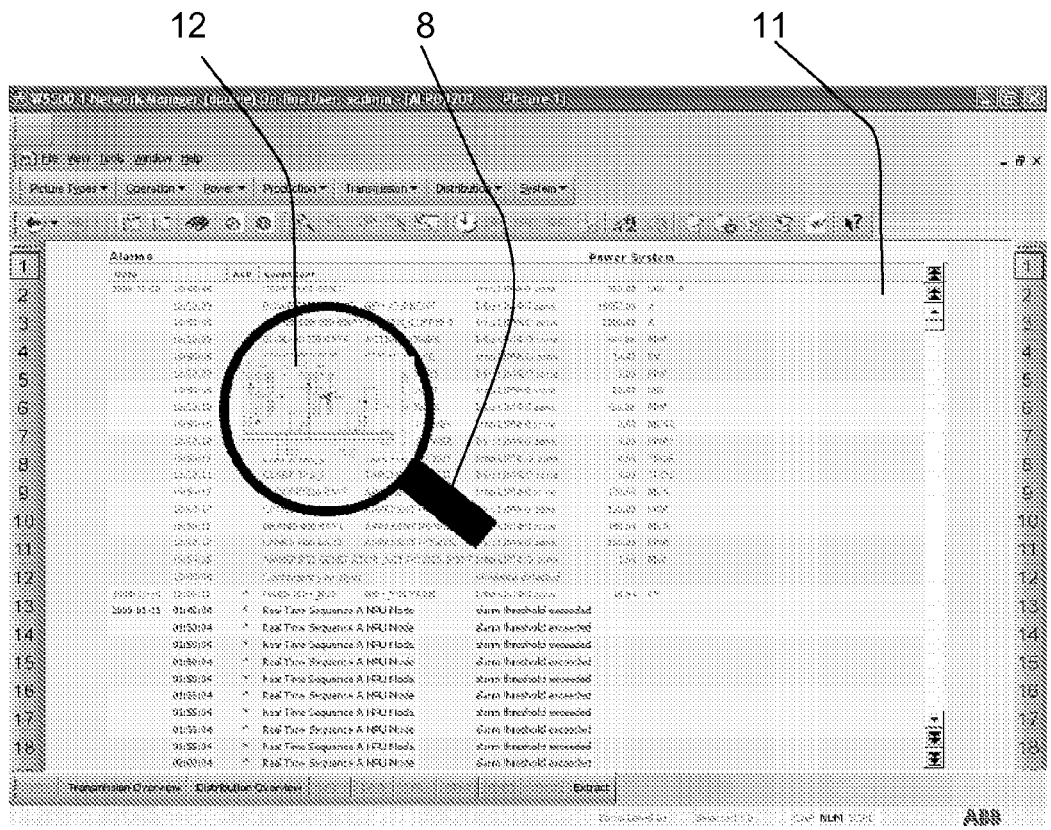
Fig. 5
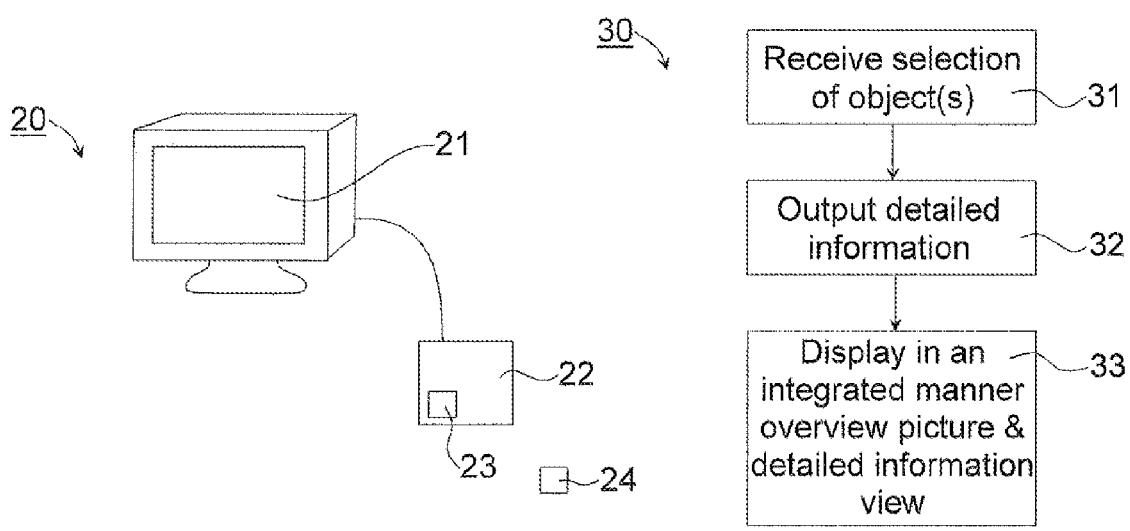
Fig. 6
Fig. 7

SUPERVISORY CONTROL SYSTEM, METHOD AND COMPUTER PROGRAM PRODUCTS

This application is the National Phase of PCT/EP2009/058672 filed on Jul. 8, 2009, which claims priority under 35 U.S.C. 119(e) to U.S. Provisional Application No. 61/202,941 filed on Apr. 22, 2009, all of which are hereby expressly incorporated by reference into the present application.

FIELD OF THE INVENTION

The invention relates generally to the field of supervision or monitoring of systems such as power network systems or process control systems, and in particular to graphical tools for such control systems.

BACKGROUND OF THE INVENTION

Supervision or monitoring of various technical systems, such as e.g. power network systems, is of great importance for ensuring proper functioning of the technical system and for enabling right action to be taken. It is important that the monitoring allows the operator thereof to quickly detect any fault conditions and also to act rapidly upon such fault conditions.

A monitoring system or supervisory control system comprising display units that show different parts of the system being monitored is a valuable tool for supervision and monitoring purposes. An overview picture shown in the display unit is a particular example of a useful way of e.g. supervising and also controlling the system status. By means of such overview picture, the operator obtains situation awareness and information needed for a decision making process.

For the supervision to be efficient the overview picture cannot be allowed to be too cluttered and therefore a lot of information is in general omitted. Detailed information related to objects of the overview picture is however often required for making well-founded decisions. Such detailed information may be available from the overview picture, presented for example by having the operator clicking on the object and opening a new window disclosing the desired detailed information. However, the overview picture is then not visible, which is obviously disadvantageous.

Another disadvantage of many currently used supervision systems is the need to perform several clicking operations in order to be able to take action when required, for example upon detection of a fault condition. The operator may need to open several windows in order to be able to remedy the fault. Valuable time is therefore lost.

There are thus several considerations to make when designing supervision systems, for example balancing the need for detailed information and the need for an easily graspable overview picture and to allow fast action to be taken.

From US 2007/0185987 an apparatus for monitoring a computer system component is known. Detailed information for and control of a computer system component can be obtained from an overview by means of an identifier associated with the computer system component. An effort to improve the monitoring of computer systems is thus presented.

SUMMARY OF THE INVENTION

However, there is often a lot of detailed information related to a particular object. It would be desirable to be able to access different views of such detailed information, still without loosing the overview picture.

Further, there may be a need to present the detailed information in a different way than the overview picture, such as in the form of data sheets, graphs, diagrams etc.

In view of the above, it is a general object of the invention to provide means and methods for enabling a further yet improved monitoring of technical systems, in particular power network systems and process control systems.

It is another object of the invention to provide means for an operator that is monitoring a technical system to easily access detailed information, while maintaining an overview picture.

It is still another object of the invention to provide means and methods for increasing the simultaneous visibility of different levels of information.

It is yet another object of the invention to provide means and methods for enabling rapid action to be taken upon need.

These objects, among others, are achieved by means of a system, by a method and by computer program products as claimed in the independent claims.

In accordance with an aspect of the invention, a supervisory control system for controlling a technical system such as a power network is provided. The supervisory control system comprises a display unit for displaying an overview picture of the technical system, wherein the overview picture comprises at least one object. The supervisory control system further comprises a display view displaying in an integrated manner the overview picture, which comprises overview information, and a detailed information view, which comprises detailed information. By means of the invention, the operator does not have to navigate down to a desired detail view in order to be aware of the system status and possibly take required action. The operator is thus able to quickly take appropriate action when needed. The invention further provides increased simultaneous visibility of different levels of information by the integration of detailed information in an overview picture.

In accordance with another aspect of the invention, a method for enabling supervision of a technical system is provided. The method may be implemented in a supervisory control system as above, comprising a display unit that shows an overview picture of the technical system. The method comprises the steps of: receiving input signals indicating a selection of at least one object of interest shown in the overview picture; outputting, on the display unit, a detailed information view for the at least one object in response to receiving the input signals; and displaying the detailed information view comprising detailed information related to the object in an integrated manner with the overview picture. By means of the method, improved supervision of the technical system is enabled in that the operator is able to easily display information of interest. The information is further shown in a highly comprehensive and visible way.

In an embodiment of the invention, the method comprises the further step of alternating between different detailed information related to the selected object. This is preferably done in response to receiving input signals indicating a selection of different detailed information to be shown.

In another embodiment of the invention, the method also enables the reception, in the detailed information view, of input commands related to a certain action, such as tripping a circuit breaker, and effectuation of the action. The operator may thus take appropriate action in a very fast manner, obviating the need to perform several clicking operations for opening a specific window in which such action is to be taken, as in the prior art.

In still another embodiment of the invention, the method comprises the further step of alternating between different detailed information related to the object. The alternating is preferably done in response to receiving input signals, entered by the operator, indicating a selection of some other detailed information to be shown. The alternating can be done in different ways, for example by clicking on a detailed information view.

In yet another embodiment of the invention, the method comprises the further step of displaying the detailed information view in an opaque or transparent manner integrated with the overview picture. By means of this feature, the operator may adapt the transparency of the detailed information view in accordance with need. If, for example, the detailed information view comprises information that is best illustrated in an opaque manner integrated with the overview picture, the operator may adjust the settings to this end.

In yet another embodiment of the invention, the method comprises the further step of outputting the detailed information view in a magnifier window. A layer beneath the overview picture may be shown on the display unit, by means of such magnifier window, wherein the layer comprises detailed information related to an object located within the boundaries of the magnifier window. This provides an easy to use tool for panning around the overview picture in order to see detailed information.

The invention also comprises computer program products.

Further features and advantages thereof will become clear upon reading the detailed description and the attached drawings.

BRIEF DESCRIPTION OF THE DRAWINGS

FIGS. 4 and 5 illustrate different detailed information views in accordance with the invention.

FIG. 6 illustrates a supervisory control system in accordance with the invention.

FIG. 7 illustrates a flow chart over steps of a method I accordance with the present invention.

DETAILED DESCRIPTION OF EMBODIMENTS OF THE INVENTION

Figure 1:
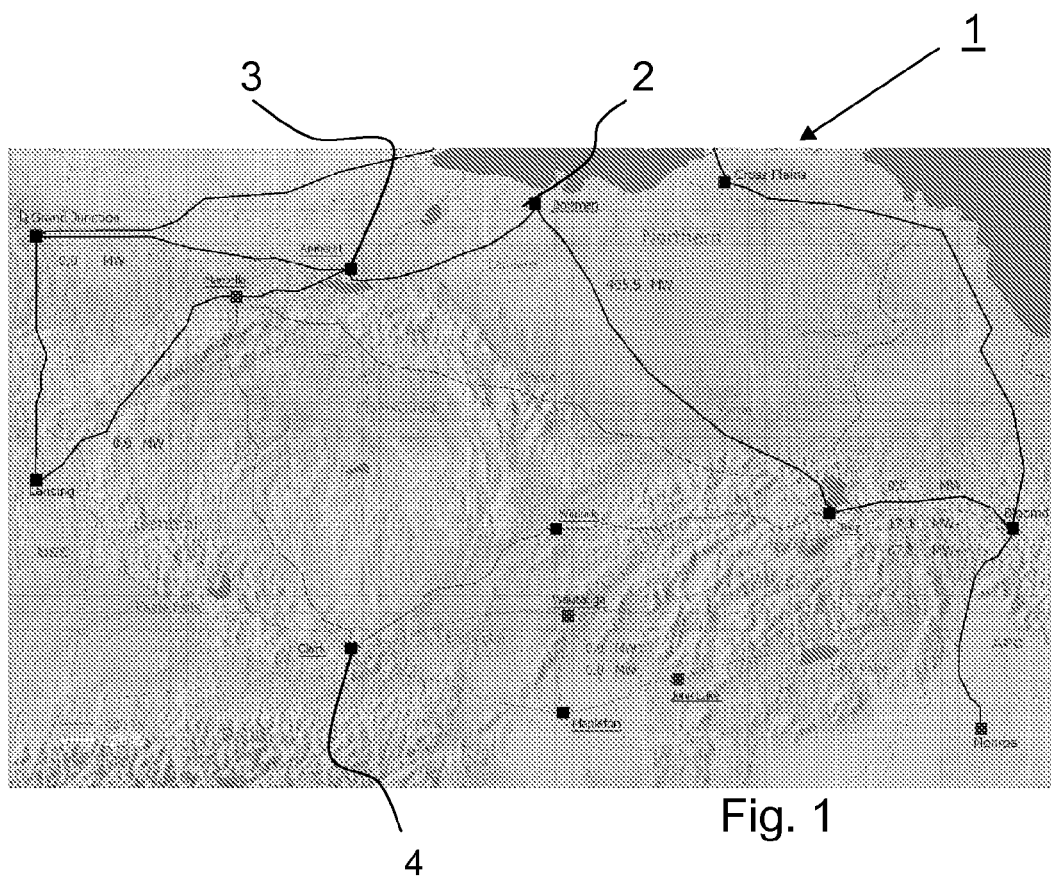
FIG. 1 illustrates an exemplary overview picture.

FIG. 1 illustrates an exemplary overview picture 1, usable when monitoring a power network system by means of a supervisory control system. The overview picture 1 comprises a map over several substations in the power network, for example substations located in Bowman, Amherst and Clark. The substations are examples of objects 2, 3, 4 present in the overview picture 1. The overview picture 1 thus illustrates the geographic location of the substations. Obviously the operator needs to known more than the location of the substations, and the supervisory control system therefore comprises more detailed information about the objects 2, 3, 4. For example, there may be a single line diagram for each substation, a list of alarms for each substation, measurement values, calculations etc.

Figure 2:
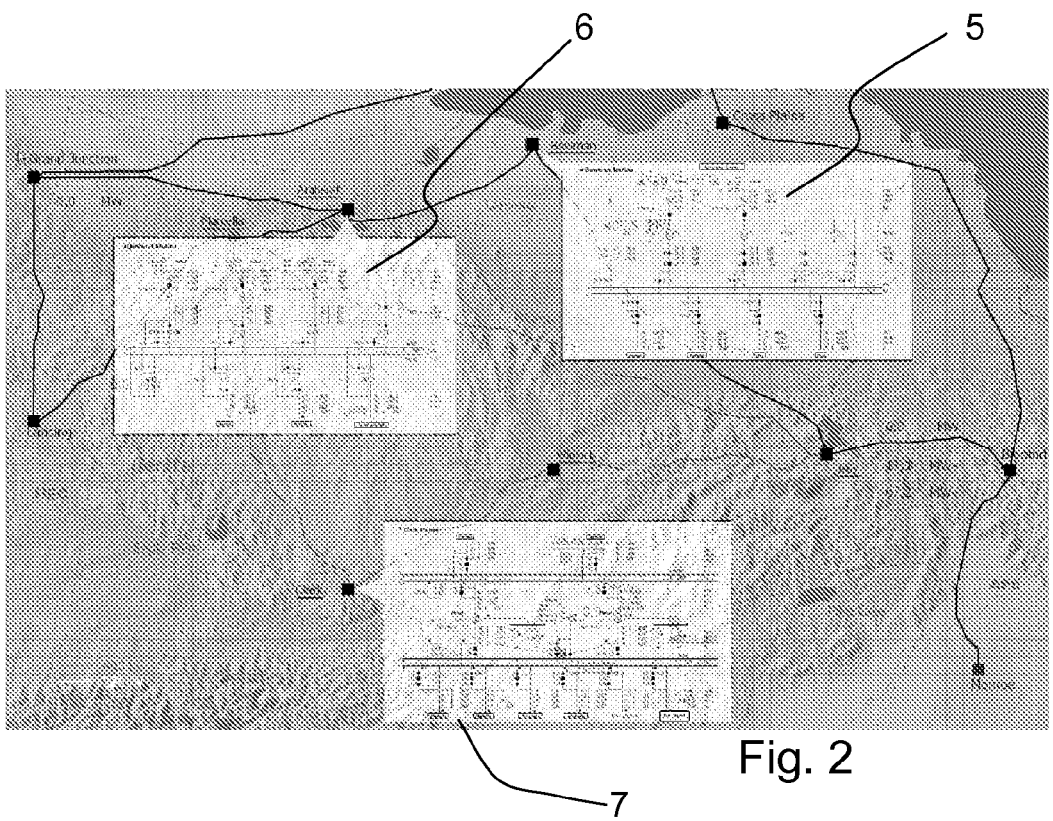
FIG. 2 illustrates detailed information views of the overview picture of FIG. 1.

FIG. 2 illustrates detailed information views 5, 6, 7 for the objects 2, 3, 4 of the overview picture 1 illustrated in FIG. 1. In accordance with the invention, the detailed information views 5, 6, 7 are opened and displayed in an integrated manner in the overview picture 1. That is, the detailed information views 5, 6, 7 are shown in an integrated manner with the overview picture 1.

Further, the detailed information views 5, 6, 7 may be shown in an opaque manner or in a semi-transparent or fully transparent manner. In an embodiment, the degree of transparency is a setting that the operator can change in accordance with need.

The operator may choose one or several objects in the overview picture 1, for example by clicking on the objects 2, 3, 4 of interest. In the example illustrated in FIG. 2, the operator has chosen to display detailed information for objects 2, 3 and 4. Instead of opening the detailed information views 5, 6, 7 in separate windows, which would clutter the overview and/or render it less visible or even not visible at all, the detailed information views 5, 6, 7 are automatically integrated into the overview picture 1.

The operator may also toggle between alternative detailed information views available for the respective object 2, 3, 4. The user may for example study one particular detailed information view 5 related to the substation located in Bowman (object 2 of the overview picture 1). By clicking on the detailed information view 5, by clicking on a back and forward button (not shown), or by any other suitable operation, the operator switches between various available detailed information views for that object. The detailed information views contain different information, e.g. an alarm list of the substation, a list of measurement values, or a data sheet with the most important data related to the substation etc. That is, the contents to be shown in the detailed information view 5 and related to the particular object 2 of interest may be chosen by the operator and altered between.

In an embodiment of the invention, the operator may resize the detailed information views 5, 6, 7. For example, if the detailed information shown in the detailed information view is too small to be readable, the operator may resize the view. This can be accomplished in any suitable manner, for example by clicking repeatedly on the detailed information view, or by dragging a corner of the view, etc.

In an embodiment of the invention, the operator may resize the information shown in the detailed information view 5, 6, 7. If the information for example comprises measurement values, the numbers may be resized to a more readable size. Further, the resizing of the information may be done without affecting the size of the detailed information view 5, 6, 7. That is, the information contained within the detailed information view 5, 6, 7 may be "zoomed in" on.

Figure 3:
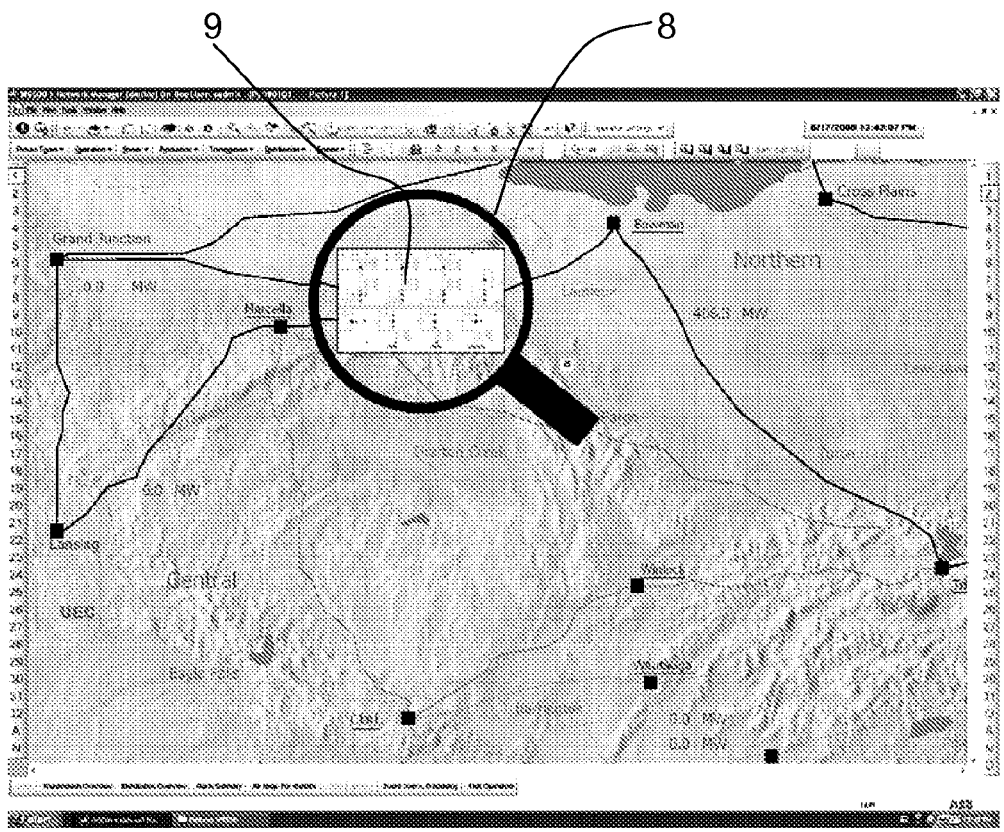
FIG. 3 illustrates a magnifier tool in accordance with the invention.

FIG. 3 illustrates another feature of the invention. Instead of choosing specific, distinct points (objects) in the overview picture 1, as in the previous embodiment, the operator may use a magnifier tool 8 to pan around the overview picture 1 in order to see detailed information related to different objects.

In an embodiment of using the magnifier tool 8, the operator does not necessarily need to click on the detailed information view 9, as described above, but this can be done automatically as the magnifier tool 8 is moved over a particular object 9.

A typical magnifier tool known in the art shows the part of the overview picture which lies underneath the magnifier tool with just an increased zoom level. That is, the increased zoom level shows the same information as the overview picture, albeit with more details. In contrast to this, the magnifier tool 8 in accordance with the invention enables the operator to see layers behind or beneath the overview picture 1, which may comprise completely different information, instead of the same information with another zooming. For example, if the operator magnifies a substation in FIG. 3 he or she would preferably not see a geographical map representation with the substation and its surrounding area having another zoom level than the rest of the overview picture, but instead the detailed information view 9, which in the illustrated example comprises a single line diagram of the specific substation, is integrated into the overview picture 1 and shown underneath the magnifier tool 8.

Figure 4:
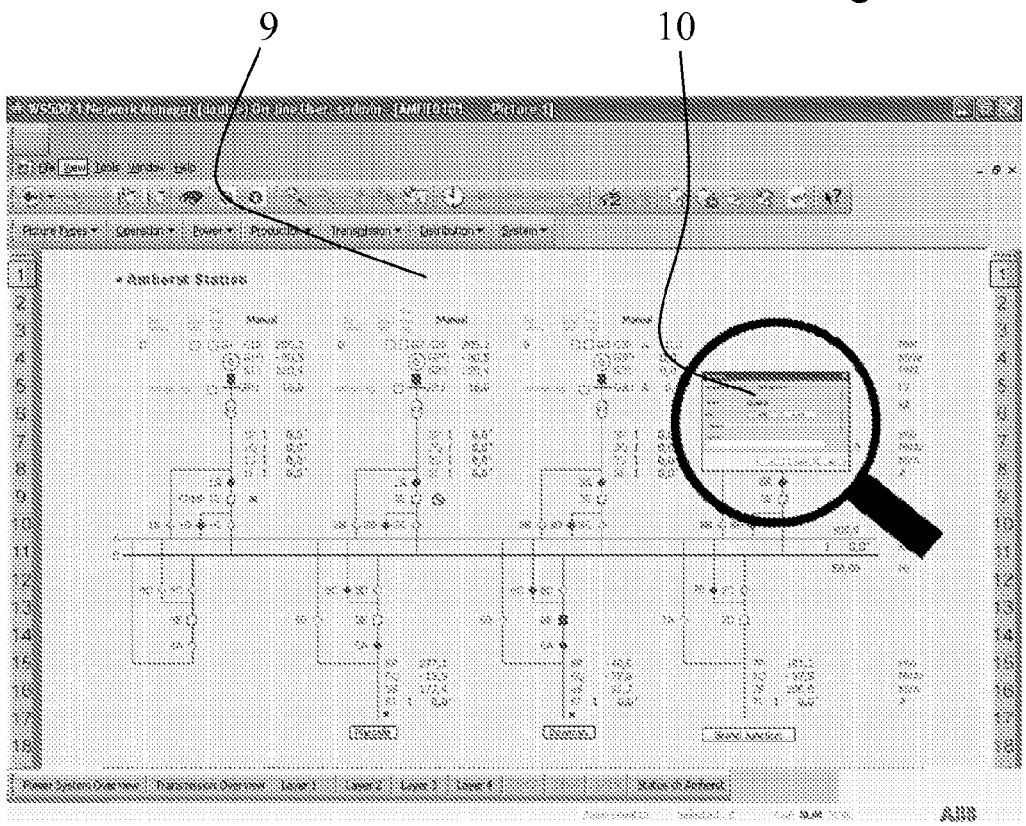

With reference to FIG. 4, the operator may also look at the single line diagram directly, i.e. the single line diagram would be the overview picture, and he or she may magnify the single line diagram in order to see e.g. the state of a circuit breaker in a further yet detailed information view 10.

FIG. 5 illustrates another example. If the operator uses the magnifier tool 8 to magnify an alarm list 11, he could choose to see the alarms in a single line diagram 12 instead of in the alarm list 11.

Different layers may thus be magnified and in an embodiment, the invention also provides interactivity in those layers. For instance, the operator may have magnified a layer behind the overview picture 1, and he is then able to interact with that magnified view. Thereby the operator is provided with a tool for quickly responding to certain actions.

As an example and with reference again to FIG. 4, if the operator magnifies a detailed information view of a circuit breaker in a single line diagram, he could open (trip) or re-close the circuit breaker without opening a separate window related to that circuit breaker.

As another example, and with reference to FIG. 3, if the operator wants to do a specific action in a single line diagram for a station, he does not need to open a separate window for this action. Instead he just magnifies the substation, e.g. by the use of the magnifying tool 8 and then interacts with the single line diagram, for example opening a circuit breaker or viewing a specific value, such as a measurement value, of interest. There is no need to perform several clicking operations and rapid action may thereby be taken if needed.

The invention also comprises a supervisory control system 20 for controlling and supervising a technical system, such as for example a power transmission network. The supervisory control system 20 comprises at least one display unit 21 on which the above described views 1, 5, 6, 7, 9, 10 may be displayed. The supervisory control system 20 further comprises a computer 22 or other processing means, in turn comprising means 23 for performing the actions as described. The invention may be implemented in software or hardware or any combination thereof. In particular, the supervisory control system 20 comprises means for displaying a display view showing in an integrated manner the overview picture 1, which comprises overview information, and one or more detailed information views 5, 6, 7, which comprise detailed information.

The supervisory control system 20 comprises means for receiving input signals indicating a selection of an object 2, 3, 4 of interest; means for displaying, on the display unit 21, a detailed information view for the selected object 2, 3, 4 in response to receiving the input signals; means for displaying in the detailed information view information related to the selected object 2, 3, 4; means for alternating between different detailed information views related to the selected object 2, 3, 4 in response to receiving input signals indicating a selection of different detailed information to be shown.

With reference to FIG. 7, the invention further comprises a method 30 that enables supervision and control of a technical system, such as the above exemplifying power network. The method 30 is implemented in the supervisory control system 20 as described above, comprising the display unit 21 showing the overview picture 1 of the technical system being supervised. In an embodiment, the method 30 comprises the steps of:

receiving 31 input signals indicating a selection of at least one object 2, 3, 4 of interest, outputting 32, on the display unit 21, a detailed information view 5, 6, 7, 9, 10 for the at least one selected object 2, 3, 4 in response to receiving the input signals, and displaying 33 the detailed information view 5, 6, 7, 9, 10 comprising detailed information related to the selected object 2, 3, 4 and the overview picture 1 in an integrated manner, whereby improved supervision of the system is enabled.

The method 30 may comprise yet additional steps. For example, the method 30 may comprise the further step of alternating between different detailed information related to the selected object 2, 3, 4 in response to receiving input signals indicating a selection of different detailed information to be shown.

The detailed information views toggled between are arranged in different layers, and the operator thus toggles between the different layers when alternating between the various detailed information views.

The method 30 may comprise the further step of alternating between different detailed information related to the object 2, 3, 4. The alternating is preferably done in response to receiving input signals, entered by the operator, indicating a selection of some other detailed information to be shown.

The method 30 may comprise the further steps of receiving, in the detailed information view 5, 6, 7, 9, 10, input commands related to a certain action, such as tripping a circuit breaker, and effectuating the action. That is, the operator enters a command, for example "trip circuit breaker", simply by e.g. clicking on a box in the detailed information view comprising such command.

The method 30 may comprise the further step of resizing the detailed information view 5, 6, 7, 9, 10 upon reception of a user input signal indicating a resizing request. That is, the operator may resize the detailed information view 5, 6, 7, 9, 10, for example by input signal corresponding to the dragging of a corner of the detailed information view by means of a computer mouse or some other input device.

The method 30 may comprise the further steps of resizing the detailed information. In particular, the method 30 may comprise the further steps of receiving input signals related to a zooming level of the detailed information that is related to the selected object 2, 3, 4. The detailed information is contained within the detailed information view 5, 6, 7. The information is then resized accordingly. By means of these steps, the detailed information may be zoomed in on without enlarging the detailed information view 5, 6, 7, which is advantageous in that the operator can read the information without the detailed information view being enlarged and thereby covering the overview picture.

The method 30 may comprise the further step of displaying the detailed information view 5, 6, 7 in an opaque or transparent manner integrated with the overview picture 1. The degree of transparency may be a setting that the operator can change as desired.

The method 30 may comprise the further step of outputting the detailed information view 5, 6, 7, 9, 10 in a magnifier window 8. A layer beneath the overview picture 1 may be shown on the display unit, by means of such magnifier window 8, wherein the layer comprises detailed information related to an object located within the boundaries of the magnifier window 8.

The invention may be implemented in different technical systems. In particular, the method 30 in accordance with the invention may be implemented in the supervisory control system 20 supervising such technical systems by adding suitable computer program product 23, for example stored on a computer readable medium such as a compact disc or floppy diskette, indicated schematically in FIG. 6 at 24. The method of the present invention can thus be implemented as a computer program product 23, which is loadable e.g. into the computer 22 of the supervisory control system 20. The computer program product 23 comprises software code portions for performing the method 30 when the product is run on the computer 22.

The invention thus also encompasses the computer program product 23. For example, the computer 22 comprises means for receiving the computer readable medium 24 and means for executing the computer program product 23 for carrying out the steps of: receiving 31 input signals indicating a selection of at least one object 2, 3, 4 of interest; outputting 32, on the display unit 21, a detailed information view 5, 6, 7, 9, 10 for the at least one selected object 2, 3, 4 in response to receiving the input signals; and displaying 33 the detailed information view 5, 6, 7, 9, 10 comprising detailed information related to the selected object 2, 3, 4 and the overview picture 1 in an integrated manner, whereby improved supervision of the system is enabled. Further related steps may also be implemented by means of the computer program product 23.

In summary, in its most general embodiment the invention provides means for displaying detailed information and overview information in an integrated manner, i.e. within a single window. The detailed information is thus not displayed in a separate window placed above the window showing the overview picture. Further, the operator is able to take action swiftly upon detection of e.g. a fault condition directly inside the displayed detailed information. Further yet, the operator may toggle between different kinds of information in a facilitated manner.

The invention claimed is:

1. A supervisory control system supervising a power transmission system, said supervisory control system comprising:
a display unit for displaying an overview picture of said power transmission system or part of said power transmission system, said overview picture comprising at least one object, said supervisory control system providing a display view displaying in an integrated manner said overview picture comprising overview information and a detailed information view comprising detailed information, said detailed information view being related to one of the objects,
wherein said detailed information view is arranged to be shown in a movable magnifier window as the magnifier window is moved over said associated object.

2. The supervisory control system as claimed in claim 1, further comprising means for alternating between two or more views showing information related to said at least one object, said views being shown in an alternating manner in a single window.

3. The supervisory control system as claimed in claim 2, comprising means for displaying said detailed information view in an opaque or transparent manner integrated with said overview picture.

4. The supervisory control system as claimed in claim 2, comprising means for resizing said detailed information views.

5. The supervisory control system as claimed in claim 1, comprising means for displaying said detailed information view in an opaque or transparent manner integrated with said overview picture.

6. The supervisory control system as claimed in claim 5, comprising means for resizing said detailed information views.

7. The supervisory control system as claimed in claim 1, comprising means for resizing said detailed information views.

8. The supervisory control system as claimed in claim 1, wherein said detailed information and a part of the overview picture of said power transmission system are simultaneously displayed in the movable magnifier window.

9. A power transmission system supervising method, said method being implemented in a supervisory control system comprising a display unit showing an overview picture of said power transmission system, said method comprising the steps of:
receiving input signals indicating a selection of an object of interest shown in said overview picture through a movable magnifier window being moved over said object;
outputting, on said display unit and in said magnifier window, a detailed information view for said object in response to receiving said input signals; and
displaying said detailed information view comprising detailed information related to said object in an integrated manner with said overview picture,
whereby supervision of said power transmission system is enabled.

10. The method as claimed in claim 9, further comprising the step of alternating between different detailed information related to said object in response to receiving input signals indicating a selection of different detailed information to be shown.

11. The method as claimed in claim 10, further comprising the steps of receiving, in said detailed information view, input commands related to a certain action, such as tripping a circuit breaker, and effectuating said action.

12. The method as claimed in claim 10, comprising the further step of resizing said detailed information view upon reception of a user input signal indicating a resizing request.

13. The method as claimed in claim 9, further comprising the steps of receiving, in said detailed information view, input commands related to a certain action, such as tripping a circuit breaker, and effectuating said action.

14. The method as claimed in claim 13, comprising the further step of resizing said detailed information view upon reception of a user input signal indicating a resizing request.

15. The method as claimed in claim 9, comprising the further step of resizing said detailed information view upon reception of a user input signal indicating a resizing request.

16. The method as claimed in claim 9, comprising the further step of displaying said detailed information view in an opaque or transparent manner integrated with said overview picture.

17. The method as claimed in claim 9, comprising the further step of showing, by means of said magnifier window, a layer beneath said overview picture, said layer comprising detailed information related to an object located within said magnifier window.

18. The method as claimed in claim 9, wherein said detailed information view and said overview picture are arranged in different layers.

19. The method as claimed in claim 9, further comprising the steps of:
receiving input signals related to a zooming level of said detailed information related to said object and contained within said detailed information view; and
resizing said information accordingly.

20. A computer program product stored on a non-transitory computer readable storage medium, comprising computer readable program code means for causing a computer of a supervisory control system, to carry out the method as claimed in claim 9.

21. The method as claimed in claim 9, further comprising simultaneously displaying said detailed information and a part of the overview picture of said power transmission system in the movable magnifier window.

\* \* \* \* \*